United States Patent Office 3,801,703
Patented Apr. 2, 1974

3,801,703
METAL BORACITES
Tom Allen Bither, Jr., Woodbrook, Del., assignor to E. I. du Pont de Nemours and Company, Wilmington, Del.
No Drawing. Filed Sept. 17, 1971, Ser. No. 181,605
Int. Cl. C01b 21/20, 35/00
U.S. Cl. 423—277     7 Claims

ABSTRACT OF THE DISCLOSURE

Boracites of the formula $M_3B_7O_{13}NO_3$ are described wherein M is at least one of Co, Ni, Cu, Zn or Cd. The compounds can be prepared by heating boron trioxide, metal borates or other sources of boron with $MNO_3$ at 65 kilobars and a temperature of 600 to 1000° C. The compounds are crystalline having orthorhombic symmetry, space group $Pca2_1$. The compositions are useful as the working elements in piezoelectric devices and are also ferroelectric.

FIELD OF THE INVENTION

This invention relates to novel compounds of boracite-type crystal structure and to their use in piezoelectric and pyroelectric devices.

PRIOR ART

Boracites are recognized as a distinct class of compounds based on the prototype mineral named boracite, $Mg_3B_7O_{13}Cl$. It is widely known that Mg can be replaced by the divalent ions Cr, Mn, Fe, Co, Ni, Cu, Zn, and Cd and that Cl can be replaced by Br or I without a major change in the structure type or the characteristic properties of the compounds. Widespread interest in the boracites results from their useful electrical, magnetic and optical properties. These occur in several useful crystallographic modifications of the basic structure. For example, a cubic, high-temperature form is optically isotropic and piezoelectric; slightly distorted orthohombic, and/or trigonal (rhombohedral), modifications exist at lower temperatures and are optically anisotropic and ferroelectric. The temperatures of transition between the various forms vary widely among the known boracite compounds.

Since the low-temperature forms of lower symmetry generally have the more useful properties, it is desirable to obtain boracite compositions whose low-temperature forms are stable at ambient conditions.

Boracite compounds, $M_3B_7O_{13}X$, wherein M is a variety of divalent cations and X is one of the halogens Cl, Br and I, are disclosed in British Pat. 1,070,834 to Schmid. Despite intensive studies of the halogen series, no analogous compound with fluorine, $M_3B_7O_{13}F$, has been found.

Elements other than a halogen have been suggested in some cases as occupying the unique anion site, X, in the boracite structure; see, for example, Ascher et al., Solid State Communications 2, 45–49, 1964 for OH-boracites, and Fouassier et al., Z. Anorg. Allg. Chem., 375, 202–208, 1970 for S-boracites. No indication has been given that the $NO_3^-$ ion might occupy an anion site in the boracite structure.

SUMMARY OF THE INVENTION

The compositions of the present invention are novel boracites, $M_3B_7O_{13}NO_3$, wherein M is at least one divalent ion of Co, Ni, Cu, Zn or Cd.

DETAILED DESCRIPTION OF THE INVENTION

The novel products of the invention expressly include compounds of formula $M_3B_7O_{13}NO_3$, having the above stated limitations on M and having the characteristic boracite-type structure in crystal modifications which yield an X-ray diffraction powder pattern that can be indexed on the basis of an orthorhombic unit cell. It is an object of the invention to obtain the boracites in well-defined crystals, preferably in the form of single crystals of sufficient size for the attachment of electrodes to opposing crystal faces.

The recognition of these new compositions as boracites is readily made by their stoichiometry, $M_3B_7O_{13}NO_3$, determined by analysis and by their X-ray diffraction patterns. The latter bear a characteristic resemblance to that of the Mg-Cl species, the mineral boracite whose structure in both high- and low-temperature forms has been reported by Ito et al., Acta. Cryst. 4, 310 (1951). The high-temperature form of the mineral and that of all other boracites whose high-temperature structure has been described give an X-ray powder pattern characteristic of the space group $F\bar{4}3c$.

For the products of this invention, the X-ray pattern of the high-temperature form where it has been determined, is also consistent with this $F\bar{4}3c$ face-centered cubic symmetry. In their low-temperature forms the known boracites are described as having orthorhombic distortions (space group $Pca2_1$) of the prototype cubic phase. The low-temperature forms of the new boracites show X-ray diffraction patterns which can similarly be indexed by an orthorhombic (with $Pca2_1$ extinctions) unit cell.

The $NO_3$-boracites are prepared by heating the hydrated metal nitrates, $M(NO_3)_2 \cdot xH_2O$, with a source of boron, conveniently $B_2O_3$, at a pressure of 65 kbars at temperatures ranging from 600–1000° C. using a tetrahedral anvil device such as that described by Lloyd et al., J. Res. Nat. Bur. Stands., 65c 59 (1959). High pressures are believed to be essential to prevent decomposition of the nitrate group at temperatures below those necessary to provide a kinetically favorable incorporation of the $NO_3$ group into the boracite lattice. Reduction of the nitrate ion at the reaction temperature may also prevent the formation of $NO_3$-boracites for divalent metals such as Cr, Mn, and Fe, which are readily oxidized to the trivalent state. It is preferred to have the nitrate ion present in excess of that required to provide the $B/NO_3$ ratio of 7.0 required by the formula $M_3B_7O_{13}NO_3$, $B/NO_3$ ratios from 0.6 to 3.0 are most useful to insure the full accommodation of $NO_3$ in the boracite structure. Atom ratios, $B/M$ in the starting mixture generally range from 1.0 to 6.0.

Each of the $NO_3$-boracites of Co, Ni, Cu, Zn, and Cd, as normally prepared by slowly cooling or by quenching, occurs in a low-temperature orthorhombically distorted form of the prototype cubic structure stable at high temperature. Transformation to the high-temperature form can be followed by differential scanning calorimetry. The thermal effect is sharp and reversible, endothermic on heating. High-temperature X-ray diffraction shows the transformed material to be of higher symmetry, consistent with the face-centered cubic structure of $F\bar{4}3c$ symmetry heretofore reported for the cubic boracites. The transformation temperatures, however, are generally higher than those reported for the known boracites as can be seen in Table A.

TABLE A
[Transformation temperatures, °K., for $M_3B_7O_{13}X$]

| X/M | Co | Ni | Cu | Zn | Cd |
|---|---|---|---|---|---|
| $NO_3$ | 729 | 700 | 602 | 741 | 786 |
| Cl [1] | 623 | 610 | 365 | 723 | 798 |
| Br [1] | 458 | 398 | 224 | 586 | 734 |
| I [1] | 197 | 61 | | 687 | 617 |

[1] As reported by Schmid, J. Phys. Chem., Solids 26, 985 (1965), lower values have since been reported for Co-Cl and Zn-Cl.

NO₃-boracites containing mixed cations, $(M,M')_3B_7O_{13}NO_3$, exhibit transformation temperatures intermediate to those of their end members. Transformation of the NO₃-boracites to their low-temperature, orthorhombic form generally involves more distortion of the cubic prototype than does the transformation of the known orthorhombic boracites. This is indicated by the ratio of the two smaller orthorhombic cell dimensions $b/a$ which is approximately 1.03 for the nitratoboracites as compared to a value of essentially unity (about 1.001 or less) for the known halogenoboracites.

Either $B_2O_3$ or $H_3BO_3$ may be used as a source of boron, and even BN may be used if water is present in the system. The $M/B$ atom ratio in the starting materials may range from 1/6 to 1/1. Ratios poorer in metal than the stoichiometric 3/7 are generally preferred so that excess reactants are easily removed by hot water extraction.

UTILITY

Like the boracites well known to the art, the new compounds of this invention have the capacity of producing valuable electrical and optical switching effects which derive from their special structures. All of the boracites have structures which are noncentrosymmetric and thus are capable of piezoelectric effects. In their low-temperature forms, the boracite crystals are believed to be comprised of domains characterized by distinct polarization and strain vectors which may give rise to nonlinear interactions with an applied electrical field, a mechanical strain or a thermal gradient.

Because of their relatively large distortions from cubic symmetry, the new boracites of this invention provide an opportunity for larger ferroelectric polarization and ferroelastic strain than occurs in the halogenoboracites previously known to the art.

As an example, opposing faces of a boacite single crystal may be electroded by conventional techniques of vapor deposition of a conductive metal or by painting with a commercially available silver paste, to which connecting leads may be attached. If the crystal is then appropriately clamped to prevent extraneous movements, the application of an A.C. voltage can be used to generate sonic waves by periodic vibration induced in the direction of the electrical gradient.

A pyroelectric device can be made by focusing a pulsed heat input, e.g., from a laser source, onto one such electroded face. An electrical output across the electrodes can then be measured as pulses of voltage or current using the appropriate electrical detector.

Further embodiments of the invention will be obvious from the illustrative examples given below.

EXAMPLE 1

A 0.178 g. pellet made from a mixture of 0.476 g. of $Co(NO_3)_2 \cdot 6H_2O$ (1.64 mmoles) and 0.114 g. of $B_2O_3$ (1.64 mmoles) and contained in a gold capsule was pressured to 65 kbars in a tetrahedral anvil device and heated for two hours at 1000° C., slow-cooled for 4 hours to 400° C., and quenched to room temperature. The resultant solids were then extracted with hot water to remove soluble impurities. Deep-red polyhedra, some up to 1 mm. in cross-section, were obtained as the main product of this reaction. Minor amounts of both pink and white crystals were present as secondary product. The deep-red polyhedra were then isolated by hand for characterization.

An X-ray diffraction powder pattern was obtained from these deep-red polyhedral crystals with a Hägg-Guinier camera using monochromatic Cu radiation and a KCl as internal standard ($a$=6.2931 A.). This powder pattern (Table I) was similar to that of the mineral boracite, $Mg_3B_7O_{13}Cl$, but appreciable line-splitting was noted, indicating either the same low-temperature form of the orthorhombic boracite-type structure as in $Mg_3B_7O_{13}Cl$ (space group P$ca2_1$ pertains) but with a higher degree of distortion from the high-temperature cubic form or a distorted structure related to that of boracite but having different symmetry. The powder pattern could be indexed on the basis of an orthorhombic unit cell using space group P$ca2_1$ extinctions with $a$=8.509, $b$=8.761, and $c$=12.213 A. (volume=910.4 A.³).

TABLE I

[X-ray diffraction powder pattern of Co₃B₇O₁₃NO₃]

| Intensity [1] | h | k | l | d Spacing, A. |
|---|---|---|---|---|
| 5 | 1 | 1 | 0 | 6.1031 |
|   | 0 | 0 | 2 |  |
| 5 | 0 | 2 | 0 | 4.3799 |
| 15 | 1 | 1 | 2 | 4.3163 |
| 40 | 0 | 2 | 2 | 3.5579 |
| 25 | 2 | 0 | 2 | 3.4897 |
| 100 | 0 | 0 | 4 | 3.0521 |
|   | 2 | 2 | 0 |  |
| 10 | 1 | 3 | 0 | 2.7621 |
|   | 3 | 0 | 1 |  |
| 45 | 1 | 1 | 4 | 2.7303 |
|   | 2 | 2 | 2 |  |
| 20 | 3 | 1 | 0 | 2.6974 |
| 15 | 1 | 3 | 2 | 2.5166 |
| 10 | 0 | 2 | 4 | 2.5050 |
| 5 | 2 | 0 | 4 | 2.4831 |
| 1 | 3 | 1 | 2 | 2.4690 |
| 10 | 0 | 1 | 5 | 2.3553 |
|   | 2 | 3 | 1 |  |
| 15 | 0 | 4 | 0 | 2.1899 |
| 55 | 2 | 2 | 4 | 2.1586 |
| 20 | 4 | 0 | 0 | 2.1273 |
| 15 | 1 | 4 | 1 | 2.0903 |
| 25 | 2 | 3 | 3 | 2.0714 |
|   | 1 | 2 | 5 |  |
| 20 | 2 | 1 | 5 | 2.0578 |
|   | 3 | 2 | 3 |  |
|   | 0 | 4 | 2 |  |
| 15 | 4 | 1 | 1 | 2.0383 |
|   | 0 | 0 | 6 |  |
|   | 3 | 3 | 0 |  |
| 5 | 3 | 1 | 4 | 2.0220 |
| 5 | 4 | 0 | 2 | 2.0087 |
| 2 | 2 | 4 | 0 | 1.9452 |
| 10 | 1 | 1 | 6 | 1.9308 |
|   | 3 | 3 | 2 |  |
| 40 | 2 | 4 | 2 | 1.8553 |
| 25 | 0 | 2 | 6 | 1.8467 |
|   | 4 | 1 | 3 |  |
|   | 3 | 0 | 5 |  |
| 25 | 2 | 0 | 6 | 1.8366 |
| 40 | 4 | 2 | 2 | 1.8262 |
| 20 | 0 | 4 | 4 | 1.7799 |
| 25 | 4 | 0 | 4 | 1.7459 |
| 5 | 2 | 2 | 6 | 1.6938 |
|   | 3 | 3 | 4 |  |
| 5 | 1 | 5 | 2 | 1.6543 |
| 10 | 0 | 0 | 8 | 1.5264 |
|   | 4 | 4 | 0 |  |
| 5 | 1 | 1 | 8 | 1.4808 |
|   | 4 | 4 | 2 |  |
| 5 | 5 | 3 | 2 | 1.4296 |
|   | 1 | 6 | 1 |  |
| 5 | 0 | 6 | 2 | 1.4192 |
|   | 6 | 0 | 0 |  |
| 10 | 4 | 2 | 6 | 1.3939 |
|   | 6 | 0 | 2 |  |
| 10 | 2 | 6 | 0 | 1.3813 |

[1] An intensity value of 100 is assigned to the strongest line of the pattern.

Chemical analysis of this phase showed 2.60% nitrogen to be present. This result coupled with the preceding X-ray data is indicative of a new class of boracite-type phase $M_3B_7O_{13}NO_3$, wherein the halogen X (Cl, Br, or I) in the known boracites $M_3B_7O_{13}X$ is replaced by the monovalent nitrate anion group NO₃; Calcd. for $Co_3B_7O_{13}NO_3$: N, 2.68%.

Magnetic susceptibility measurements indicated Curie-Weiss-type behavior for this boracite-type compound from room temperature to 140° K., with a value of $p_{eff}$ of 4.99 $\mu_B$/Co atom based on the formula $Co_3B_7O_{13}NO_3$. This effective moment is compatible with that for high-spin $Co^{+2}$ in an octahedral environment, such as pertains in the boracite structure. At lower temperatures, magnetic ordering set in and a magnetic moment $\mu_s$ of 2.6 emu./g. was observed at 4.2° K.

EXAMPLE 2

A 0.179 g. pellet made from a mixture of 0.698 g. of $Co(NO_3)_2 \cdot 6H_2O$ (2.4 mmoles) and 0.101 g. of $B_2O_3$ (1.45 mmoles) was heated at 65 kbars pressure in the manner of Example 1. Following extraction with hot water, a red-brown solid comprising intergrown polycrystalline chunks was obtained. A Debye-Scherrer X-ray diffraction powder pattern of this material was the same as that of the boracite-type phase described in Example 1, indicating formation of the compound $Co_3B_7O_{13}NO_3$.

By use of a differential scanning calorimetry technique (DSC), a sharp and reversible thermal transition was detected in this compound around a temperature of 456° C., in the manner observed in the known boracites $M_3B_7O_{13}X$, wherein X is Cl, Br, or I. X-ray diffraction powder patterns made on this $Co_3B_7O_{13}NO_3$ boracite at room temperature following heatings through the transition to temperatures as high as 770° C. were identical to that of the compound prior to the heating, confirming the reversibility of the transition and also indicating the thermal stability of this compound.

EXAMPLE 3

Pellets weighing 0.174–0.176 g. made from a mixture of 0.666 g. of $Co(NO_3)_2 \cdot 6H_2O$ (2.3 mmoles) and 0.160 g. of $B_2O_3$ (2.3 mmoles) and contained in gold capsules were pressured to 65 kbars in a tetrahedral anvil device, heated for 6 hours at temperatures of 800° C. or 600° C., and then quenched to room temperature. The resultant products were extracted with hot water. From the reaction carried out at a temperature of 800° C., irregularly shaped, deep-red shards were isolated having a Debye-Scherrer X-ray diffraction powder pattern that was the same as that of the boracite-type phase described in Example 1. Analysis for oxygen gave 50.2%; Calcd. for $Co_3B_7O_{13}NO_3$: 49.0%.

From the reaction carried out at a temperature of 600° C., red polyhedral crystals similar in appearance to those of Example 1 and having the same X-ray diffraction powder pattern were isolated mixed with some white crystals of $HBO_2$. An infrared spectrum on these red $Co_3B_7O_{13}NO_3$ crystals confirmed the presence of trigonally- and tetrahedrally-coordinated boron, both of which are present in the boron-oxygen network of the boracite structure. The infrared spectrum was also compatible with the presence of a nitrate group in this compound.

EXAMPLE 4

A 0.171 g. pellet made from a mixture of 0.350 g. of $Co(NO_3)_2 \cdot 6H_2O$ (1.20 mmoles) and 0.250 g. of $B_2O_3$ (3.60 mmoles) was heated at 600° C. in the manner of Example 3. Deep-red polyhedral crystals were isolated following extraction of the reaction product with hot water.

A 0.184 g. pellet made from a mixture of 2.911 g. of $Co(NO_3)_2 \cdot 6H_2O$ (10 mmoles) and 0.496 g. of BN (20 mmoles) was heated in the manner of Example 1 in a Pt capsule. Irregularly shaped reddish crystallites plus a few black crystals ($Co_3O_4$) were isolated following extraction of the reaction product with hot water.

The red phase isolated from each of these reactions gave the same Debye-Scherrer X-ray diffraction powder pattern as that of $Co_3B_7O_{13}NO_3$ as described in Example 1.

EXAMPLE 5

A 0.180 g. pellet made from a mixture of 0.476 g. of $Ni(NO_3)_2 \cdot 6H_2O$ (1.64 mmoles) and 0.114 g. of $B_2O_3$ (1.64 mmoles) was heated in the manner of Example 1. Following extraction with hot water to remove soluble impurities, a mixture of irregularly shaped, orange-brown crystallites plus some green to yellow-green platelets was obtained. The orange-brown phase was isolated for characterization and a Debye-Scherrer X-ray diffraction powder pattern obtained thereon was observed to be isotypic with that of the boracite-type compound $Co_3B_7O_{13}NO_3$ of Example 1. This powder pattern could be indexed on the basis of an orthorhombic unit cell using space group $Pca2_1$ extinctions with $a=8.441$, $b=8.716$, and $c=12.141$ A. (volume=893.3 A.$^3$). Analysis of this boracite phase showed 47.93% oxygen to be present; Calcd. for $Ni_3B_7O_{13}NO_3$: 49.06%. The measured density of one piece was 3.71 g./cm.$^3$; Calcd. for $Ni_3B_7O_{13}NO_3$ having four molecules per orthorhombic unit cell, $d=3.81$ g./cm.$^3$.

An infrared spectrum on these $Ni_3B_7O_{13}NO_3$ crystals was very similar to that obtained on the $Co_3B_7O_{13}NO_3$ boracite-type compound of Example 1 and confirmed the presence of trigonally- and tetrahedrally-coordinated boron, both of which are present in the boron-oxygen network of the boracite structure. Differential scanning calorimetry showed the presence of a sharp and reversible thermal transition in this $Ni_3B_7O_{13}NO_3$ boracite around a temperature of 427° C.

A second sample of $Ni_3B_7O_{13}NO_3$ was prepared in the same manner as that described previously in this example. This material was observed to give a positive test for piezoeletricity when examined with a transmission-type piezoelectricity detector. The capacitance of this compound, when measured as a function of temperature, was observed to rise sharply in the range 410–430° C. while passing through the region of the reversible transition described previously.

EXAMPLE 6

Pellets weighing 0.176 g. made from a mixture of 0.698 g. of $Co(NO_3)_2 \cdot 6H_2O$ (2.4 mmoles), 0.698 g. of $Ni(NO_3)_2 \cdot 6H_2O$ (2.4 mmoles), and 0.334 g. of $B_2O_3$ (4.8 mmoles) and contained in gold capsules were pressured in duplicate runs to 65 kbars in a tetrahedral anvil device and heated for 6 hours at 800° C., slow-cooled for 2 hours to 400° C., and quenched to room temperature. The resultant solids were combined and extracted with hot water to remove soluble impurities. A mixture of irregularly shaped red crystallites plus some tan platelets was obtained, and the red phase was isolated for characterization. A Debye-Scherrer X-ray diffraction powder pattern obtained on this red phase (Table II) was observed to be isotypic with those of the boracite-type compounds $Co_3B_7O_{13}NO_3$ (Example 1) and $Ni_3B_7O_{13}NO_3$ (Example 5). This pattern could be indexed on the basis of an orthorhombic unit cell using space group $Pca2_1$ extinctions with $a=8.476$, $b=8.729$, and $c=12.177$ A. This unit cell had a volume (901.0 A.$^3$) intermediate between those of the two end members, indicating a mixed $(Co,Ni)B_7O_{13}NO_3$ phase. Analyses on this boracite-type phase showed 48.97% oxygen and 2.50, 2.39% nitrogen to be present; Calcd. for $Co_{1.5}N_{1.5}B_7O_{13}NO_3$: O, 49.03%; N, 2.68%.

Differential scanning calorimetry showed the presence of a sharp and reversible thermal transition in this

boracite around a temperature of 442° C. By use of a high temperature X-ray diffraction powder camera, the pattern of $(Co,Ni)_3B_7O_{13}NO_3$ at 300° C. appeared to be the same as that at room temperature (except for thermal displacement of all reflections). At the higher temperature of 500° C., a much simpler pattern was obtained. This was difficult to read but face-centered cubic symmetry was suggested with a cell dimension $a \sim 12.2$ A. Upon cool-down, the lower-symmetry pattern was again present at room temperature. These data are consistent with the behavior of the known halogenoboracites, wherein $F\bar{4}3c$ symmetry pertains in their high-temperature form above their respective reversible transitions.

A positive test for piezoeelectricity was obtained in a second sample of $(Co,Ni)_3B_7O_{13}NO_3$ prepared in the same manner as that described previously in this example. The capacitance of this material, when measured as a function of temperature was observed to rise sharply while passing through the region of the reversible transition described previously. Magnetic susceptibility measurements indicated Curie-Weiss type behavior for this boracite-type compound from room temperature to about 100° K., with a value $p_{eff}$ of 4.4 $\mu_B\sqrt{Co,Ni}$ atom. This effective moment is compatible with that for a mixture of high spin $Co^{+2}+Ni^{+2}$ in an octahedral environment such as pertains in the boracite structure. In contrast to $Co_3B_7O_{13}NO_3$ (Example 1), essentially no magnetic ordering was observed at 4.2° K. in this mixed (Co,Ni) nitrato-boracite.

TABLE II

[X-ray diffraction powder pattern of $Co_{1.5} Ni_{1.5} B_7O_{13} NO_3$]

| Intensity [1] | h | k | l | d Spacing, Å. |
|---|---|---|---|---|
| 10 | 0 0 | 0 1 | 2 0 | 0.694 |
| 2 | 1 | 1 | 1 | 5.436 |
| 10 | 0 | 2 | 0 | 4.361 |
| 20 | 1 | 1 | 2 | 4.302 |
| 55 | 0 | 2 | 2 | 3.547 |
| 35 | 2 | 0 | 2 | 3.479 |
| 2 | 1 | 1 | 3 | 3.379 |
| 100 | 0 2 | 0 2 | 4 0 | 3.042 |
| 2 | 0 | 1 | 4 | 2.869 |
| 10 | 1 | 3 | 0 | 2.747 |
| 50 | 2 1 | 2 1 | 2 4 | 2.721 |
| 20 | 3 1 | 1 3 | 0 1 | 2.688 |
| 5 | 0 3 | 3 1 | 2 1 | 2.626 |
| 15 | 1 | 3 | 2 | 2.504 |
| 10 | 3 | 1 | 2 | 2.460 |
| 25 | 2 | 3 | 1 | 2.353 |
| 5 | 1 | 1 | 5 | 2.258 |
| 20 | 0 | 4 | 0 | 2.182 |
| 55 | 2 | 2 | 4 | 2.151 |
| 20 | 4 | 0 | 0 | 2.118 |
| 15 | 1 | 4 | 1 | 2.082 |
| 35 | 1 2 3 | 2 3 2 | 5 3 3 | 2.064 |
| 30 | 2 0 4 | 1 4 1 | 5 2 1 | 2.050 |
| 25 | 0 3 | 0 3 | 6 0 | 2.031 |
| 5 | 4 3 3 | 0 3 1 | 2 1 2 | 2.002 |
| 5 | 1 | 1 | 6 | 1.923 |
| 50 | 2 | 4 | 2 | 1.849 |
| 35 | 0 | 2 | 6 | 1.841 |
| 25 | 2 | 0 | 6 | 1.830 |
| 40 | 4 | 2 | 2 | 1.819 |
| 20 | 0 | 4 | 4 | 1.774 |
| 20 | 4 | 0 | 4 | 1.739 |
| 5 | 2 3 | 2 3 | 6 4 | 1.688 |
| 2 | 4 5 | 3 1 | 2 1 | 1.650 |
| 2 | 5 | 1 | 3 | 1.539 |
| 10 | 0 4 | 0 4 | 8 0 | 1.521 |
| 2 | 1 | 5 | 4 | 1.490 |
| 5 | 1 4 | 1 4 | 8 2 | 1.476 |
| 10 | 3 | 5 | 2 | 1.441 |
| 5 | 5 1 4 2 | 3 6 4 5 | 2 1 3 4 | 1.424 |
| 5 | 1 0 6 | 2 6 0 | 8 2 1 | 1.416 |
| 10 | 3 5 2 | 2 2 4 | 7 4 6 | 1.403 |
| 10 | 4 | 2 | 6 | 1.390 |
| 10 | 6 2 5 | 0 6 3 | 2 0 3 | 1.377 |
| 20 | 2 4 | 2 4 | 8 4 | 1.361 |
| 5 | 2 4 6 | 5 0 2 | 5 7 0 | 1.345 |

[1] An intensity value of 100 is assigned to the strongest line of the pattern.

EXAMPLE 7

A 0.192 g. pellet made from a mixture of 0.966 g. of $Cu(NO_3)_2 \cdot 3H_2O$ (4.0 mmoles) and 0.279 g. of $B_2O_3$ (4.0 mmoles) was heated at 800° C. in the manner of Example 3. Straw-yellow crystallites in the form of irregular pieces were obtained following extraction with hot water to remove soluble impurities. A Debye-Scherrer X-ray diffraction powder pattern obtained on this material was observed to be isotypic with those of the boracite-type compounds $Co_3B_7O_{13}NO_3$ (Example 1) and $Ni_3B_7O_{13}NO_3$ (Example 5) and could be indexed on the basis of an orthorhombic unit cell using space group $Pca2_1$ extinctions with $a=8.445$, $b=8.663$, and $c=12.102$ A. (volume=885.4 A.³).

Analyses on this boracite-type phase showed 48.45% oxygen and 2.40, 2.34% nitrogen to be present; Calcd. for $Cu_3B_7O_{13}NO_3$; O, 47.74%, N, 2.61%. Differential scanning calorimetry showed the presence of a sharp and reversible thermal transition in this $Cu_3B_7O_{13}NO_3$ boracite around a temperature of 329° C.

EXAMPLE 8

A 0.179 g. pellet made from a mixture of 0.892 g. of $Zn(NO_3)_2 \cdot 6H_2O$ (3.0 mmoles) and 0.209 g. of $B_2O_3$ (3.0 mmoles) was heated for 8 hours at 800° C. in the manner of Example 3. Following extraction with hot water, a mixture of irregularly shaped beige and colorless crystals was obtained. The beige crystals were isolated and a Debye-Scherrer X-ray diffraction powder pattern obtained thereon was observed to be isotypic with those of the Co, Ni, and Cu-nitratoboracite phases of Examples 1, 5, and 7 indicating formation of $Zn_3B_7O_{13}NO_3$. This powder pattern, after deletion of a few lines belonging to the second phase above, could be indexed on the basis of an orthorhombic unit cell using space group $Pca2_1$ extinctions with $a=8.510$, $b=8.775$, and $c=12.222$A. (volume=910.6 A.³).

A second sample of $Zn_3B_7O_{13}NO_3$ prepared from the same starting materials at 1000° C. and in a manner similar to that of Example 1 was found by differential scanning calorimetry to have a sharp and reversible thermal transition around a temperature of 468° C.

EXAMPLE 9

In a manner similar to the preceding example, a 0.219 g. pellet made from a mixture of 2.000 g. of $$Cd(NO_3)_2 \cdot 4_2O$$

(6.5 mmoles) and 0.451 g. of $B_2O_3$ (6.5 mmoles) and contained in a platinum capsule with internal boron nitride end plugs inserted for crystallite nucleating sites was pressured to 65 kbars in a tetrahedral anvil device and heated for 5 hours at 800° C., slow-cooled for 4 hours to 400° C., and quenched to room temperature. The resultant product was treated with hot water, both to extract out soluble impurities and to disperse out unreacted BN from the end plugs. Hazy, colorless crystals were isolated that had an X-ray diffraction powder pattern that was observed to be isotypic with that of the Zn-nitratoboracite described above. This powder pattern could be indexed on the basis of an orthorhombic unit cell using space group $Pca2_1$ extinctions with $a=8.806$, $b=8.981$, and $c=12.603$ A. (volume=996.8 A.³. Analysis on this boracite-type phase showed 2.4% nitrogen to be present; Calcd. for $Cd_3B_7O_{13}NO_3$: N, 2.1%. Differential scanning calorimetry showed the presence of a sharp and reversible thermal transition in a second sample of this $$Cd_3B_7O_{13}NO_3$$

boracite around a temperature of 513° C.

EXAMPLE 10

A 0.190 g. pellet of $Zn(NO_3)_2 \cdot 6H_2O$ (0.64 mmole) contained in a nongas-tight gold capsule and cold-pressured to 65 kbars was reacted therein with $B_2O_3$, furnished by a slow transport mechanism from an external packing comprising a mixture of boron nitride/boric acid/hydrous aluminum silicate, at a temperature of 1000° C. for 2 hours followed by a cool to 400° C. in 6 hours and a subsequent quench to room temperature. Following removal of water-soluble impurities, off-white crystals of cubic habit were isolated that had a Debye-Scherrer X-ray diffraction powder pattern the same as that of $Zn_3B_7O_{13}NO_3$ of Example 8. Analysis for nitrogen confirmed the formation of this boracite by way of a transport process; Found: N, 2.26%; Calcd. for $Zn_3B_7O_{13}NO_3$: N, 2.58%.

The embodiments of the invention in which an exclusive property or privilege is claimed are defined as follows:

1. Metal boracites having the formula $$M_3B_7O_{13}NO_3$$

wherein M is at least one divalent metal ion of Co, Ni, Cu, Zn or Cd.

2. Composition of claim 1 having the formula $$Co_{1.5}Ni_{1.5}B_7O_{13}NO_3$$

3. Composition of claim 1 wherein M is Co.
4. Composition of claim 1 wherein M is Ni.
5. Composition of claim 1 wherein M is Cu.
6. Composition of claim 1 wherein M is Zn.
7. Composition of claim 1 wherein M is Cd.

References Cited
UNITED STATES PATENTS 3,384,447  5/1968  Schmid _____ 423—277

MILTON WEISSMAN, Primary Examiner

U.S. Cl. X.R.

252—62.9